March 18, 1952  C. H. LEARNED  2,589,618
MIRROR SIGNALING DEVICE
Filed May 11, 1944
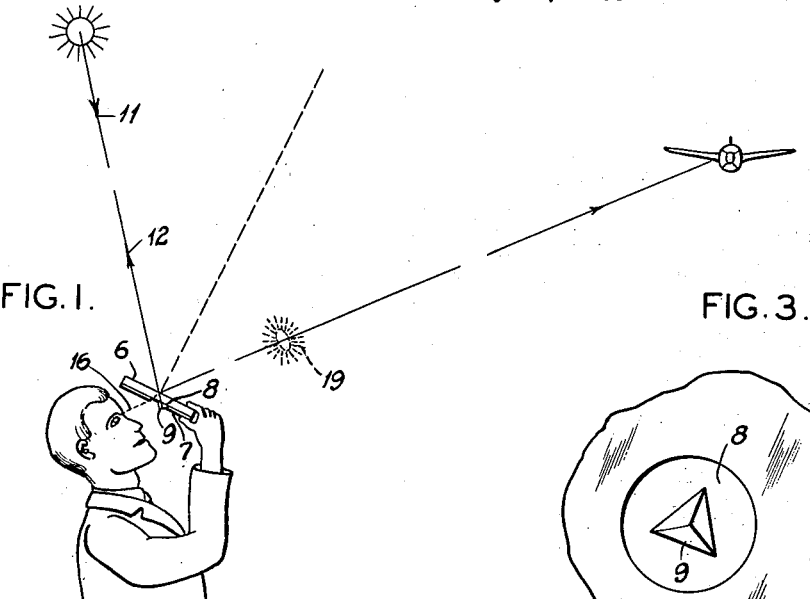
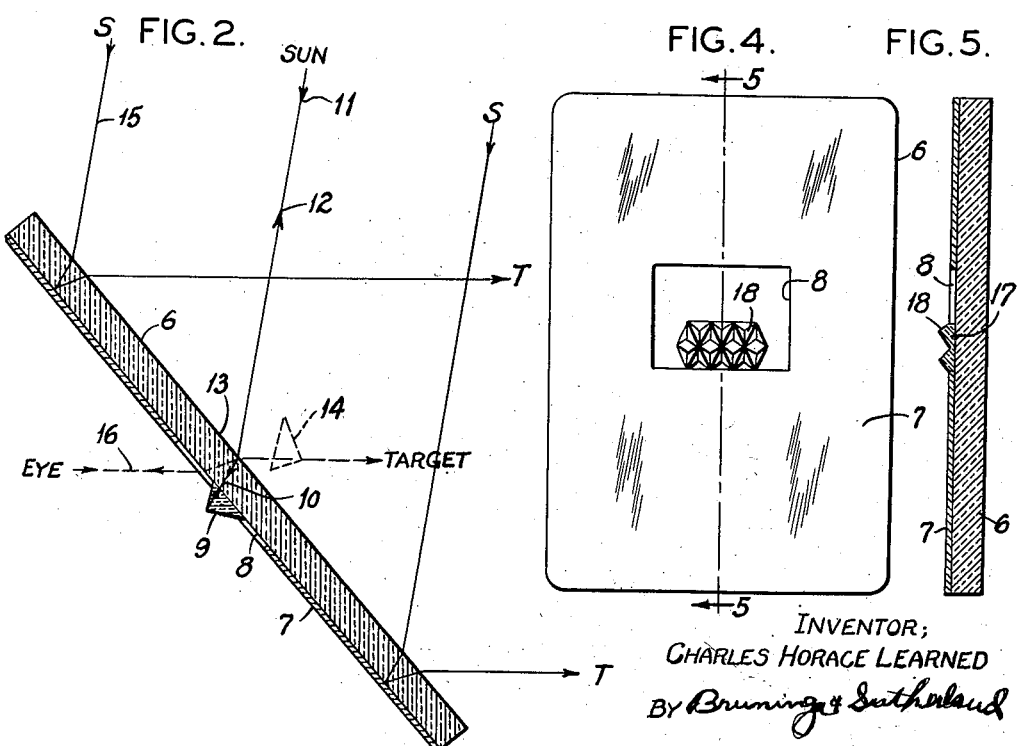
INVENTOR;
CHARLES HORACE LEARNED
BY Bruning & Sutherland
ATTORNEYS Patented Mar. 18, 1952

2,589,618

UNITED STATES PATENT OFFICE 2,589,618

MIRROR SIGNALING DEVICE

Charles Horace Learned, Carmel, Calif.

Application May 11, 1944, Serial No. 535,107

11 Claims. (Cl. 116—20)

This invention pertains to signalling devices employing mirrors; more particularly to portable, pocket type devices used for sun signalling by a person in distress to distant apparent sources of rescue; and still more particularly this invention provides improved means for aiming portable devices which makes their performance compare favorably with the surveyor's heliotrope, a precision optical instrument which is bulky, heavy and requires a stationary foundation such as a tripod for its successful use.

One of the objects of this invention is to provide a device designed for free manipulation with reference to a moving target so that the operator may aim the device at the target and project light from a distant source, such as from the sun, onto the target.

Further objects will appear from the detail description, taken in connection with the accompanying drawings, in which:

Figure 1 is a schematic view of a signalling device embodying this invention is use.

Figure 2 is a sectional view of an illustrative embodiment of this invention and an optical diagram.

Figure 3 is a partial plan view of Figure 2.

Figure 4 is a plan view of another embodiment of the invention, and

Figure 5 is a section of Figure 4 on the line 5—5.

Generally stated and in accordance with the illustrative embodiments of this invention, the device comprises a mirror adapted to receive light from a distant source, such as from the sun and to project the light on a target such as a moving airplane. A window is provided through which the target may be viewed and adjacent this window is arranged a retro-directive reflector (see G. A. Van Lear, Jr., in The Journal of the Optical Society of America, vol. 30, No. 10, pp. 462–487, October 1940, particularly pages 463, etc.) which will be in the path of the light. A transparent reflecting surface is positioned in the return path of the light from the retro-directive reflector and is adapted to reflect the light to the eye on a line nearly coinciding in direction with light reaching the eye from a target in the path of the light projected by the mirror. In this way the operator is able to view simultaneously and superimposed, both an image of the sun and the target. The retro-directive device may be so positioned as to lie close to the mirror in order to provide substantially a flat, plate-like structure. Means may also be provided to screen the light to the eye so that it is subdued in intensity. The device may be made of glass or of a transparent plastic such as methyl methacrylate.

This invention in its various embodiments may comprise the following elements and functions:

A. A transparent plate or sheet of glass or plastic as a carrier for the mirror and for other essential use as will appear below.

B. A metallic film or other suitable mirror on one surface of the transparent sheet. This mirror may cover most of the area of the plate and reflect light from the sun toward the target.

C. A window on the transparent plate formed by an interruption of the mirror. This fulfills the three-fold function of providing:

(1) An unobstructed view of the target through the mirror, covering a wide enough field of vision when held at a comfortable distance from the operator's eye so that a fast moving object can be readily followed and not lost from view.

(2) A transparent surface parallel with or a part of the same surface on which the mirror is formed, which unmirrored surface transmits a phantom virtual image of the sun by surface reflection.

(3) An aperture to admit light from the sun to the retro-directive reflector system described below.

D. A retro-directive reflector system placed in back of, or optically integral with the window and so placed that light will enter the reflector from the sun and be reflected back toward the sun, a fractional portion being "surface reflected" by the transparent plate so as to form a phantom virtual image of the sun. This image the sender superimposes upon the target by movement of the device as a whole.

The mode of operation is indicated schematically in Fig. 1. The signalman or operator grasps the device between the thumb and forefinger of one hand, with the transparent plate 6 facing outward and generally toward both the sun and target. The device is brought close enough to one eye so that the operator peers through the transparent window 8 and sees the target in a wide and unobstructed field of view. This field is essential to comfortable and successful operation especially when the target is a rapidly moving airplane.

The operator while directing his attention on the target rotates the plate slowly and searchingly until the light reflected by the mirror falls on a hand or other object placed near the line of sight. Peering past the retro-directive reflector 9 on the side toward the sun, the operator sees, by oblique vision, in the direction of the reflected light revealed by interception, a phantom image of the sun 19 which appears in and beyond the window. Once the phantom has been seen and the operation of the device understood, the operator instinctively fronts the mirror to a position closely enough approximating a bisection of the angle between the sun and target for the phantom to be brought into view almost instantly.

By the time the phantom is found the target may have passed out of the center of vision. The operator knows its approximate position, however, and he slowly rotates the mirror so that the phantom moves towards the target which is again found and brought back into the center of vision. With both the phantom and target in view, the mirror has now been rotated to approximately the correct angle. The operator steadies himself as best he may and superimposes the phantom upon the target, at which time a sunlight signal is flashed from the mirror 7 to the target.

So efficient is this light, portable, cheaply constructed device that a form of it is used successfully from a bobbing rubber raft in rough water to signal the pilot of a plane eight miles distant and traveling at more than 200 miles per hour. The aiming device is so simple, precise, and direct that it is best compared to the simple sighting of a rifle, without any necessity to compensate for elevation, wind, drift, etc., often necessary with a rifle.

The details of construction, and path of light rays in operation, of one embodiment of this invention are illustrated in Figs. 2 and 3. In these views, 6 is a transparent plate or sheet of glass or plastic having plane, parallel, highly polished surfaces. One surface of the plate is provided with a reflecting metallic film 7 and conventional protective paint coating in order to form an opaque second surface mirror; although it will be understood that a front surface mirror may also be used and for certain purposes might be best. The mirror 7 is interrupted at 8 to form a transparent window, the utility of which has been described heretofore. In the present embodiment a circular shape is chosen, with sufficient margin surrounding the centrally located retro-directive reflector so that the device may be used equally well when held from any corner or side.

Part 9 is a reflecting element or optical system called a retro-directive reflector throughout this specification because of its property of reversing the direction of light entering the system regardless, within wide operating limits, of the angular inclination of the incident light. Thus the path of sunlight entering the retro-directive reflector 9 through the window 8 is reversed in direction within the reflector and returned coincident upon or parallel to its entering path as indicated by the arrows at 10 and 12.

The retro-directive reflector 9 chosen for this embodiment is the well-known triple reflector or cube corner comprising three plane, mutually perpendicular reflecting surfaces intersecting at a common point which defines the axis of the system. Light entering the aperture of this reflector system is triple reflected from each surface of the system in succession and about the axis, whereupon leaving the aperture, the light is completely reversed in its direction and returns toward the source in a coincident or parallel path. The retro-directive refector 9 is of the solid transparent type made of glass or plastic in the form of a tetrahedron whose fourth surface may be either perpendicular or inclined to the axis of the device. This front surface of the tetrahedron may be, and is shown here to be cemented to the plate 6 in a manner which establishes optical continuity.

A means is preferably provided which will subdue the brightness of the phantom image 19 of the source of light to a point bearable and comfortable to the eye. For this purpose the reflector 9 can be made of colored glass or plastic, preferably amber or red of a deep enough density to filter out all objectionable intensity.

The three reflecting surfaces of the reflector 9 do not require silvering or other metallic mirroring to assure their efficient functioning for the requirements of the device, total internal reflection being depended upon in the embodiments shown, but a protective metallic mirror may be provided as a protection against water, dust, or other damage to the rather delicate triple reflecting surfaces.

The retro-directive element, or a multiplicity of elements as hereinafter described, should be precisely and carefully made in order to preserve a small, clear and evenly shaped phantom image of the sun, which image is depended upon for the accurate aiming of the device.

Now having described the elements making up the assembly, consider the central sun ray 11 shown in Fig. 2 which impinges upon the front surface of the plate 6. This ray is refracted and continues its path to the interior of the reflector 9, where it is reflected three times from surface to surface about the axis and is returned in a coincident path as indicated by the arrows 10. The major portion of the light is then refracted again and leaves the plate 6 along the incident path as indicated by arrow 12. However a fractional portion of the returned light, 16 (now filtered red or amber by the material of the reflector) is reflected by the transparent surface 13, sufficient to form a distinctly visible image to the operator whose eye is properly placed to see that image as described heretofore. The image formed is viewed through a phantom virtual image 14, much subdued, of the aperture of the reflector 9, but the only significant thing seen is a remote, distinct, quite bright phantom virtual image of the sun itself as indicated in Fig. 1 at 19.

For convenience only a typical central ray has been traced through the refracting and reflecting path, but it will be understood by one skilled in the art that the phantom image of the sun will appear approximately the same size as the sun itself, i. e. 32 minutes of arc or as much larger than that as is caused by imperfections in the construction of the device.

It is essential that the front surface 13 of the plate 6 be parallel to the mirror 7. This being the case, then a simple inspection of the path taken by the additional sun rays 15 shows that they will be reflected parallel to the line of sight through the center of the colored phantom of the sun indicated by the dotted line 16. Expressed in other terms, the rays of the sun reflected by the mirror 7 and comprising the principal beam of the signalling mirror proceed in a direction radially opposite to a subdued beam reflected by a transparent surface of the signalling mirror into the eye of the operator.

Any position of the device within the functioning limits of the retro-directive reflector and the design and shape of the window will produce an identical result. As a practical matter it has been found possible to reflect a sun signal by means of the aiming device to practically any point on the horizon or in the sky except to points very close to the sun and directly opposite thereto.

The device of Fig. 2 with a single small retro-directive reflector has the advantage of producing a single clean-cut image of the sun; but it has the disadvantage of requiring an exact placement of the pupil of the eye in the path of the pencil of spot is often difficult to find initially, and in the case of a pitching boat may be very difficult to hold in view, once found.

In Figs. 4 and 5 shown another embodiment of the invention overcoming this difficulty. The plate 6, mirror 7, and window 8 are the same as in Figs. 2, 3 but somewhat differently proportioned. The retro-directive reflector 17 in this embodiment comprises a multiplicity of merging individual triple reflecting units 18 arranged with their light apertures in contiguous relation to form an aperture for a reflector 17 having considerable area. This reflector is constructed preferably in one piece as indicated on the drawing and of the same transparent material as the plate 6, whether glass or plastic, and is cemented to an unmirrored portion of the plate to establish optical continuity therewith. The window 8 is made rectangular in shape and the reflector located along one margin thereof in order to conserve space and minimize the amount of window area which must be subtracted from the total area available. Appropriate instruction "Top-Bottom" are printed on the plate to assist the operator.

The tranpsarent plate 6, Fig. 5 is proportioned in thickness relative to the aperture size of the composite reflector 17 so that reflected sun light forming the phantom image will pass through the clear window above or to the ends of the reflector without interruption, when the device is moved through the angles usually encountered in service.

The operator, when using this embodiment, after the mirror is placed generally in position near the eye with a clear view through the window, has little difficulty in finding the phantom spot because of the large size of the reflector aperture as compared to the eye pupil, and once found he is in little danger of losing it even when pitched about. While his eye may shift considerably, when he is intent on holding the spot in view, he will involuntarily shift enough to carry through from beam to beam reflected from one or another of the small reflector units, but not enough to lose aim by passing beyond the margin of the composite beam.

To one skilled in the art it will be obviuos that the retro-directive reflector comprised of a series of small, contiguous optical systems will serve equally well in practice as a large retro-directive optical system having far greater weight, depth and bulk—and which, for portable devices of the character being considered, would be out of the question.

As is true in the description and construction of nearly all inventions, in this device also, many changes may be made in detailed construction, some of them possibly important in their own right, without departing from the spirit and scope of this invention. For instance, without considering them essential to this invention, among many others, the following details of construction may be varied:

1. The mirror 7 may be placed on the front of the plate 6 in which case the plate need not have exactly parallel surfaces.

2. A simple transparent plate without any metallic mirror may be used and seen for long distances.

3. A slightly convex or concave mirror may be used to increase the size of the target field covered by the primary beam.

4. Diffusion means may be introduced in or upon the mirror plate to reduce the intensity of the primary beam for use at shorter distances for transmitting message by dash-dot code—so that the receiver will not be blinded.

5. Any one of several means may be used to reduce the intensity of the phantom sun so that it will not blind the operator or hide the target.

6. Color tint may be introduced into the plate so that the primary beam will contrast with surface reflections from water.

7. The retro-directive reflector system may be one of several types of which I have chosen the triple reflector as most accurate.

8. The retro-directive reflector may be cast integral with the plate, cemented as described, or located in back of and separated from the plate.

Having thus described the invention what is claimed is:

1. A signalling device designed for free manipulation with reference to a moving target, comprising, a mirror adapted to receive light from a distant source in order to project the light on the target and provided with a window, a retro-directive reflector adjacent said window and in the path of the light, and a surface positioned in the path of the return light from said retro-directive reflector and adapted to reflect the light to the eye on a line nearly coinciding in direction with light reaching the eye from a target in the path of the light projected by the mirror.

2. A signalling device designed for free manipulation with reference to a moving target, comprising a mirror adapted to receive and project light from a distant source toward the target and provided with a window, a retro-directive reflector adjacent to the window and means whereby light received by said retro-directive reflector is returned to the window and reflected in a direction nearly opposite to the light projected by the mirror on a line nearly coinciding in direction with light reaching the eye from a target in the path of the light projected by the mirror so that the operator views simultaneously and superimposed, both a dim virtual image of the distant source and the target upon which the principal beam of the mirror is projected.

3. A signalling device designed for free manipulation with reference to a moving target, comprising, a mirror adapted to receive light from a distant source in order to project the light on the target and provided with a window, a retro-directive reflector lying close to the mirror and adjacent said window and in the path of the light, and a surface positioned in the path of the return light from said retro-directive reflector and adapted to reflect the light to the eye on a line nearly coinciding in direction with light reaching the eye from a target in the path of the light projected by the mirror.

4. A signalling device designed for free manipulation with reference to a moving target, comprising, a mirror adapted to receive light from a distant source in order to project the light on the target and provided with a window, a triple reflector adjacent said window and in the path of the light, and a surface positioned in the path of the return light from said triple reflector and adapted to reflect the light to the eye on a line nearly coinciding in direction with light reaching the eye from a target in the path of the light projected by the mirror.

5. A signalling device designed for free manipulation with reference to a moving target, comprising, a mirror adapted to receive light from a distant source in order to project the light on the target and provided with a window, a series of merging triple reflectors adjacent said window and in the path of the light, and a surface positioned in the path of the return light from said triple reflectors and adapted to reflect the light to the eye on a line nearly coinciding in direction with light reaching the eye from a target in the path of the light projected by the mirror.

6. A signalling device designed for free manipulation with reference to a moving target, comprising a mirror adapted to receive and project light from a distant source toward the target and provided with a window, a retro-directive reflector adjacent the window, and means whereby light received by said retro-directive reflector is subdued in intensity, returned to the window and reflected in a direction nearly opposite to the light projected by the mirror on a line nearly coinciding in direction with light reaching the eye from a target in the path of the light projected by the mirror, so that the operator views simultaneously and superimposed, both a dim virtual image of the distant source and the target upon which the principal beam of the mirror is projected.

7. A signalling device designed for free manipulation with reference to a moving target, comprising, a plate provided with a mirror adapted to receive light from a distant source in order to project the same on the target and provided with a window, a retro-directive reflector on said plate adjacent the window and in the path of the light, and a transparent surface positioned in the path of the return light from said retro-directive reflector and adapted to reflect the light to the eye on a line nearly coinciding in direction with light reaching the eye from a target in the path of the light projected by the mirror.

8. A signalling device designed for free manipulation with reference to a moving target, comprising, a plate provided with a mirror adapted to receive light from a distant source in order to project the same on the target and provided with a window, a retro-directive reflector on said plate lying close to the plate and adjacent the window and in the path of the light, and a transparent surface positioned in the path of the return light from said retro-directive reflector and adapted to reflect the light to the eye on a line nearly coinciding in direction with light reaching the eye from a target in the path of the light projected by the mirror.

9. A signaling device comprising a transparent device for sighting an object, said device having angularly disposed faces, and a planar body having at least two reflecting surfaces one of which is transparent and when placed opposite said device affords the user a view of the object sighted and reflects thereinto sun's rays varying in intensity from the rays reflected from the other surface.

10. A signalling device adapted for free manipulation with reference to a target and an operator's eye, comprising a mirror adapted to receive and project light from a distant source toward the target, and provided with a window, a retro-directive reflector located adjacent to the window so that light from the source enters the eye after being reflected from both the window and the retrodirective reflector, the direction in which the light enters the eye being substantially opposite to the direction in which the light is projected by the mirror to the target, the line of the light to the eye nearly coinciding with the line of the light projected to the target, whereby the operator views simultaneously and superimposed, both a virtual image of the said source and the target upon which the light is projected.

11. A signalling device adapted for free manipulation with reference to a target and an operator's eye, comprising a mirror which is adapted to receive and reflect light from a distant source to the target, and provided with a window which allows light from the source to pass through it and also causes some of the light to reflect from the surfaces, a retro-directive reflector adjacent to said window, and related to the window so that a beam of light from the source enters the eye at the end of a path which includes reflections from the window and the retro-directive reflector, the direction of travel of the light entering the eye being substantially opposite to the direction of travel of the light reflected by the mirror to the target, the path of the light entering the eye being substantially colinear with the path of the light reflected from the mirror to the target, whereby the operator views simultaneously and superimposed, both a virtual image of said source and of the target upon which the light is reflected.

CHARLES HORACE LEARNED.

REFERENCES CITED

The following references are of record in the file of this patent:

FOREIGN PATENTS

| Number | Country | Date |
|---|---|---|
| 9,129 | Great Britain | Apr. 22, 1903 |
| 117,760 | Australia | Nov. 10, 1932 |

OTHER REFERENCES

General Electric Review, pages 7, 8 and 9, 1944.

"Jungle, Desert, Arctic Emergencies," U. S. Army Air Forces, Flight Control Command, Safety Education Div.